April 26, 1955     K. N. FROMM     2,707,238

PHOTOMULTIPLIER TUBE CIRCUIT

Filed Sept. 13, 1949

WITNESSES:

INVENTOR
Kenneth N. Fromm
BY
ATTORNEY

United States Patent Office 2,707,238
Patented Apr. 26, 1955

2,707,238

PHOTOMULTIPLIER TUBE CIRCUIT

Kenneth N. Fromm, Pittsburgh, Pa., assignor to Westinghouse Electric Corporation, East Pittsburgh, Pa., a corporation of Pennsylvania Application September 13, 1949, Serial No. 115,445

3 Claims. (Cl. 250—207)

My invention relates to radiation responsive apparatus and more particularly to radiation detectors.

In accordance with the teachings of the prior art of which I am aware, photomultiplier tubes have been used for the detection of radiation. However, in most of these, the output has been a D. C. current. This has the disadvantage that to amplify the output current, a D. C. amplifier is required. The difficulty of designing and producing D. C. amplifiers which are satisfactory for this purpose makes it desirable that the photomultiplier circuit be so constructed that an A. C. amplifier may be employed, instead of the D. C. amplifier. Attempts have been made to achieve this result by using an alternating current on dynodes. This, however, has led to several difficulties among which is the high inverse voltages applied to the dynodes when the polarity of the fields reverses and produces a field between the dynodes in the opposite direction from that which is required for secondary emission. A device of this type is disclosed in Patent 2,369,206, J. C. Barnes.

Another device which attempts to accomplish this result is shown in Patent 2,323,966—M. Artzt. This patent teaches the use of a resistance in series with the phototube to develop a potential on the plate of a dynode, an A. C. potential is applied to the grid of the dynode to produce an alternating output. This scheme has the disadvantage that a large photo current is necessary, thus requiring that large radiation intensities be incident on the phototube.

It is also desirable that the output of the phototube circuit be logarithmic, i. e., that the sensitivity of the tube decrease as the intensity of incident radiation increases whch feature is not present in any of the devices described above.

It is, therefore, an object of my invention to provide a radiation detector which will detect small intensities of incident radiation, the output of which may be amplified in an A. C. amplifier.

Another object of my invention is to provide radiation detector, the sensitivity of which decreases as the intensity of radiation incident on the radiation detector increases.

Still another object of my invention is to provide radiation detector which will detect small intensities of radiation, the output of which may be amplified in an A. C. amplifier and the sensitivity of which will decrease as the intensity of radiation incident on said radiation detector increases.

Still another object of my invention is to provide a radiation detector the output of which may be amplified by an A. C. amplifier and the sensitivity of which will decrease as the intensity of the radiation incident on said radiation detector increases.

An ancillary object of my invention is to provide a radiation detector, the output of which can be amplified in an A. C. amplifier and of which the method of modulating does not set the lower limit of intensity.

In accordance with my invention I provide a radiation detector comprising a photomultiplier tube with a pentode vacuum tube connected thereto in such a manner that the potentials applied to the dynodes of the photomultiplier tube are functions of the current through the pentode. The control grid of the pentode is connected to the photomultiplier tube in such manner that its potential is a function of the current through the photomultiplier tube thereby increasing the resistance offered by the pentode to the current through it and diminishing the current through the pentode, when the current through the phototube increases, and thus decreasing the sensitivity of the phototube as the current through it increases. As the current through the phototube increases in response to increases in the intensity of radiation incident on the cathode thereof, the sensitivity of the phototube decreases as the intensity of incident radiation increases. This produces an output potential which increases substantially as the logarithm of the intensity of incident radiation.

The screen grid of the pentode has an A. C. potential impressed thereon so that the potentials applied to the photomultiplier are pulsating D. C. potentials. The output of the photomultiplier is, therefore, an A. C. potential which may be amplified in an A. C. amplifier while the fields between the dynodes are constant in direction, i. e. the field directions between the dynodes do not reverse during any part of a cycle of the A. C. applied to the circuit.

The novel features that I consider characteristic of my invention are set forth with more particularity in the appended claims. The invention, however, with respect to both the organization and the operation thereof, together with other objects and advantages may be best understood from the following description of specific embodiments when read in connection with the accompanying drawings, in which:

Figure 1:
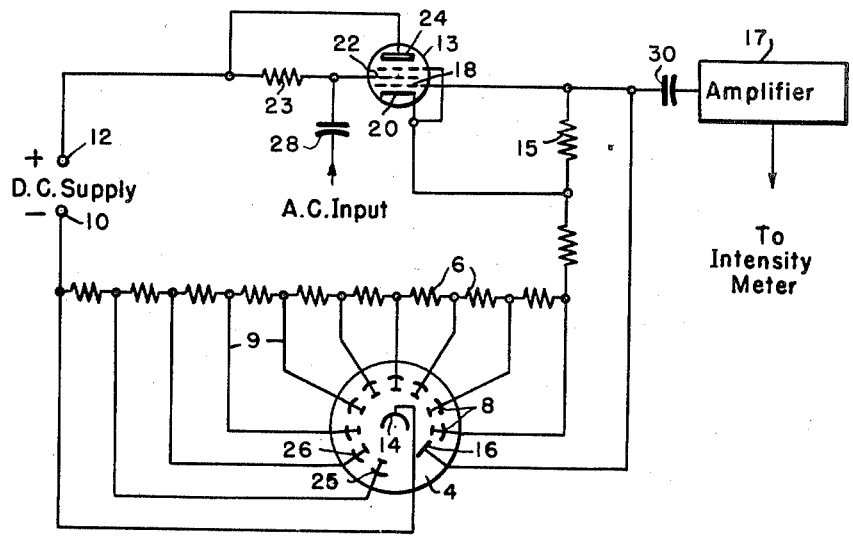
Figure 1 is a schematic diagram of apparatus embodying my invention.

A photomultiplier tube 4 is provided with a series of dynode divider resistors 6. The dynodes 8 of the photomultiplier tube are connected to conductors 9 extending from the junctions of the resistors 6. The negative side 10 of a source of D. C. potential is connected to one end of the series of dynode divider resistances 6 and the positive side 12 of the source of D. C. potential is connected through a pentode 13 to the other side of the series of dynode divider resistances 6. The cathode 14 of the photomultiplier tube is connected directly to the negative side 10 of the source of D. C. potential and the anode 16 of the photomultiplier tube is connected through the anode load resistance 15 to the positive side of the series of dynode divider resistances 6. The anode 16 of the photomultiplier tube 4 is also connected to the control grid 18 of the pentode 13, the control grid being that grid which is closest to the cathode 20 of the pentode 13. The anode of the photomultiplier tube is also connected through a condenser 30 to an A. C. amplifier 17. An A. C. potential is connected to a screen grid 22 of the pentode 13 with a capacitor 28 connected in series between the source of A. C. potential and the screen grid 22 of the pentode. A screen control resistance 23 is connected in series between the screen grid 22 of the pentode and the anode 24 of the pentode to supply a D. C. potential to the grid and also to act as a load resistor for the A. C. input.

When no radiation is incident on the photomultiplier tube the potential supplied by the source of D. C. potential will provide a potential across the pentode because the control grid will be at the same potential as the cathode and the resistance of the tube will be high. With no radiation incident on the photomultiplier tube there will be substantially no current across the anode load resistance 15 which is connected between the anode of the photomultiplier tube and the cathode 20 of the pentode. As there is no current through this resistance there will be no potential developed across it and thus no output to the A. C. amplifier. However, the current will continue to flow through the series of dynode resistors and across the pentode except as modulated by the screen grid which is connected to the source of A. C. potential. The screen grid 22 causes the current flowing through the series of dynode resistors to be a pulsating D. C.

When radiation is incident on the cathode of the photomultiplier tube, electrons pass from the cathode to the first dynode and from the first dynode 25 to the second dynode 26 and thence to successive dynodes until the pulse of electrons reaches the anode 16 of the photomultiplier tube. These electrons constitute a current inside the tube between the last dynode of the photomultiplier tube and the anode of the photomultiplier tube which current passes through the anode load resistance connected between the anode of the photomultiplier tube and the cathode of the pentode. The current through the phototube is a function of the potential applied to the dynodes and the current through the anode load resistor increases with an increase of current through the phototube. Therefore, since the potential applied to the dynode is a pulsating D. C., the potential developed across the anode load resistor will be a pulsating D. C. potential. As the pulsating D. C. is equivalent to a D. C. current with an A. C. current impressed thereon, the output may be caused to operate an A. C. amplifier. At the same time the potential developed across the coupling resistance connected between the cathode of the pentode and the anode of the photomultiplier tube will cause the control grid of the pentode to become more negative. As the control grid of the pentode becomes more negative the current flow through the pentode is restricted. As the current flow through the pentode is restricted, the current flow through the series of dynode divider resistances is restricted. This reduces the potentials applied to the dynodes of the photomultiplier tube and thus reduces the sensitivity of the photomultiplier tube.

Figure 2:
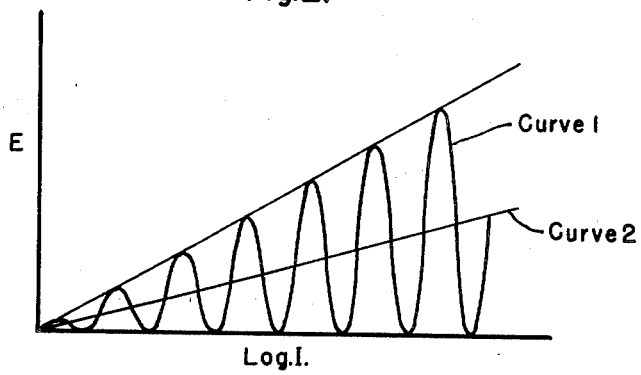
Fig. 2 is a graphical showing of the relationship between the potential of the output and the logarithm of the intensity for apparatus employed in one embodiment of my invention illustrating the manner in which the amplitude of the sinusoidal voltage output from the above of the photomultiplier tube varies with the logarithm of the intensity.

In Figure 2, I have shown a curve of the potential output through the A. C. amplifier plotted against the logarithm of the intensity for apparatus embodying my invention. This illustrates the manner in which the amplitude of the sinusoidal voltage output from the anode of the photomultiplier varies with the logarithm of the intensity. While in actual practice my relationship is not logarithmic, it is substantially so. Curve 1 of that figure which resembles a steadily increasing sine wave shows graphically the manner in which the pulsating output potentials may increase as the intensity increases. The frequency of the sine wave shown in the figure is arbitrarily chosen inasmuch as the intensity of the radiation is not a function of the A. C. current applied to the screen grid.

The following is a list of quantities which have been found satisfactory for the elements employed in one embodiment of my invention:

Source of D. C. potential_____ 950 volts.
Dynode divider resistances 6_____ 100 kilo-ohms.
Anode load resistance 15_____ 10 megohms.
Screen control resistance 23_____ 4.7 kilo-ohms.
Pentode 13_____ RCA 807.
Photomultiplier 4_____ RCA 931–A.
Capacitor 28_____ .1 microfarad.
Capacitor 30_____ .1 microfarad.

The tube numbers refer to the numbers listed in the RCA tube manual.

We thus have a radiation detector the output of which may be applied to, or amplified by, an A. C. amplifier, and the output of which increases logarithmically as the intensity of the incident radiation increases.

It is to be noted that this device also has the advantage that the method of modulating does not set the lower limit of intensity.

Although I have shown and described specific embodiments of my invention, I am aware that other modifications thereof are possible. My invention, therefore, is not to be restricted except insofar as is necessitated by the prior art and the spirit of the invention.

I claim as my invention:

1. In combination, a photomultiplier tube, a series of dynode resistors connected to the dynodes of said photomultiplier, connections for applying a D. C. potential, a current control device having a cathode side and an anode side, said control device being connected in series with said series of dynode resistors and said connections, a control member capable of controlling the current through said current control device, connections between the anode of said photomultiplier tube and said control member, connections including an impedance in series between said control member and said cathode side, a second control member and a source of modulating potential connected to said second control member.

2. In combination, a photomultiplier tube, a series of dynode resistors connected to the dynodes of said photomultiplier, connections for applying a D. C. potential, a current control device having a cathode side and an anode side, said control device being connected in series with said series of dynode resistors and said connections, a control member capable of controlling the current through said current control device, connections between the anode of said photomultiplier tube and said control member, connections including an impedance in series between said control member and said cathode side, a second control member capable of modulating the current through said control device, a source of A. C. potential connected to said second control member, and an A. C. amplifier connected to the anode of said photomultiplier tube.

3. In combination: a photomultiplier tube, a series of dynode resistors, connections between the dynodes of said photomultiplier tube and said series of dynode resistors, terminals for applying a D. C. potential, a vacuum tube, having a first grid, a cathode, and a second grid, connected in series with said terminals and said series of dynode resistors, connections between the anode of said photomultiplier tube and a first grid of said vacuum tube, connections including an impedance in series relationship between said first grid and said cathode, a second grid capable of mondulating the current through said vacuum tube, a source of A. C. potential connected to said second grid.

References Cited in the file of this patent

UNITED STATES PATENTS

| | | |
|---|---|---|
| 2,369,206 | Barnes | Feb. 13, 1945 |
| 2,454,169 | Haynes | Nov. 16, 1948 |
| 2,457,747 | Sweet | Dec. 28, 1948 |
| 2,478,163 | Sweet | Aug. 2, 1949 |